United States Patent [19]
Jerabek et al.

[11] 3,947,338
[45] Mar. 30, 1976

[54] METHOD OF ELECTRODEPOSITING SELF-CROSSLINKING CATIONIC COMPOSITIONS

[75] Inventors: Robert D. Jerabek, Glenshaw; Joseph R. Marchetti, Greensburg, both of Pa.

[73] Assignee: PPG Industries, Inc., Pittsburgh, Pa.

[22] Filed: Feb. 5, 1975

[21] Appl. No.: 547,325

Related U.S. Application Data

[63] Continuation-in-part of Ser. No. 193,591, Oct. 28, 1971, abandoned.

[52] U.S. Cl. ............................................... 204/181
[51] Int. Cl.$^2$ ......................................... C25D 13/06
[58] Field of Search ..................................... 204/181

[56] References Cited
UNITED STATES PATENTS

| | | | |
|---|---|---|---|
| 3,617,458 | 11/1971 | Brockman | 204/181 |
| 3,799,854 | 3/1974 | Jerabek | 204/181 |
| 3,891,527 | 6/1975 | Sekmakas | 204/181 |

*Primary Examiner*—Howard S. Williams
*Attorney, Agent, or Firm*—William J. Uhl

[57] ABSTRACT

It has been found that aqueous coating compositions comprising the reaction product of a partially-blocked organic polyisocyanate, an amine adduct of an epoxy group-containing resin and optionally a catalyst for urethane formation can be electrodeposited. These compositions deposit on the cathode to provide coatings having excellent properties.

6 Claims, No Drawings

METHOD OF ELECTRODEPOSITING SELF-CROSSLINKING CATIONIC COMPOSITIONS

CROSS REFERENCE TO RELATED APPLICATIONS

This application is a continuation-in-part of copending application Ser. No. 193,591 filed Oct. 28, 1971, now abandoned.

BACKGROUNND OF THE INVENTION

Electrodeposition as a coating application method involves the depostion of a film-forming material under the influence of an applied electrical potential, and has become of increasing commercial importance. Along with the increased use of such methods has been the development of various compositions which provide more or less satifactory coatings when applied in this manner. However, most conventional coating techniques do not produce commercially usable coatings, and electrodeposition of many coating materials, even when otherwise successful, is often attended by various disadvantages such as non-uniform coatings and by poor throw power, i.e., the ability to coat areas of the electrode which are remote or shielded from the other electrode. In addition, the coatings obtained are in many instances deficient in certain properties essential for their utilization in certain applications for which electrodeposition is otherwise suited. In particular, properties such as corrosion resistance and alkali resistance are difficult to achieve with the resins conventionally employed in electrodeposition processes, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resins neutralized with a base; these deposit on the anode and because of their acidic nature tend to be sensitive to common types of corrosive attack, e.g., by salt, alkali, etc. Further, anodic deposition tends to place the uncured coating in proximity to metal ions evolved at the anode, thereby causing staining with many coating systems.

DESCRIPTION OF THE INVENTION

It has now been found that aqueous coating compositions comprising the reaction product of an epoxy group containing resin, a primary or secondary amine, and optionally a partially-capped or blocked organic polyisocyanate and containing a catalyst for urethane formation may be electrocoated on a cathode to produce coatings with highly desirable properties, including alkali resistance and corrosion resistance.

The epoxy material utilized to form the electrodepositable resins of the invention can be any monomeric or polymeric compound or mixture of compounds having an average of one or more epoxy groups per molecule. The monoepoxides can be utilized but it is preferred that the epoxy compound be resinous and preferably a polyepoxide containing two or more epoxy groups per molecule. The epoxy can be essentially any of the well-known epoxides. A particularly useful class of polyepoxides are the polyglycidyl ethers of polyphenols, such as Bisphenol A. These can be produced, for example, by etherification of a polyphenol with epichlorohydrin in the presence of an alkali. The phenolic compound may be, for example, bis(4-hydroxyphenyl)2,2-propane, 4,4'-dihydroxybenzophenone, bis(4-hydroxyphenyl)1,1-ethane, bis(4-hydroxyphenyl)1,1-isobutane, bis(4-hydroxytertiarybutylphenyl)2,2-propane, bis(2-hydroxynaphthyl)methane, 1,5-dihydroxynaphthylene, or the like. In many instances, it is desirably to employ such polyepoxides having simewhat higher molecular weight and containing aromatic groups. These can be provided by reacting the diglycidyl ether above with a polyphenol such as Bisphenol A, and then further reacting this product with epichlorohydrin to produce a polyglycidyl ether. Preferably the polyglycidyl ether of a polyphenol contains free hydroxyl groups in addition to epoxide groups.

While the polyglycidyl ethers of polyphenols may be employed per se, it is frequently desirable to react a portion of the reactive sites (hydroxyl or, in some instances, epoxy) with a modifying material to vary the film characteristics of the resin. The esterification of epoxy resins with carboxylic acids, especially fatty acids, is well-known in the art and need not be discussed in detail. Especially preferred are saturated fatty acids and especially pelargonic acid. Likewise, the epoxy resin may be modified with isocyanate group containing organic materials or other reactive organic materials.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylane dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are nonphenolic and are obtained by the epoxidation of alicyclic olefins, for example, by oxygen and selected methods catalysts, by perbenzoic acids, by acetaldehyde monoperacetate, or by peracetic acid. Among such polyepoxides are the epoxy alicyclic ethers and esters which are well-known in the art.

Other epoxy-containing compounds and resins include nitrogeneous diepoxides such as disclosed in U.S. Pat. No. 3,365,471, epoxy resins from 1,1-methylene bis(5-substituted hydantoil); U.S. Pat. No. 3,391,097, bis-imide containing diepoxides; U.S. Pat. No. 3,450,711, epoxylated ammomethyldiphenyl oxides; U.S. Pat. No. 3,312,664, heterocyclic N,N'-diglycidyl compounds; U.S. Pat. No. 3,503,979, amino epoxy phosphonates; British Pat. No. 1,172,916, 1,3,5-triglycidyl isocyanurates, as well as other epoxy-containing materials known in the art.

The partially- or simi-capped or blocked isocyanate which may be employed in preparing the compositions of the invention may be any polyisocyanate where a portion of the isocyanato groups have been reacted with a compound so that the resultant capped isocyanate portion is stable to hydroxyl or amine groups at room temperature but reactive with hydroxyl or amine groups at elevated temperatures, usually between about 200° F. and about 600° F. The semi-capped polyisocyanate employed should contain an average of about one free reactive isocyanate group.

In the preparation of the partially-blocked organic polyisocyanate, any suitable organic polyisocyanate may be used. Representative examples are the aliphataic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane and 1,2-cyclohexane diisocyanates; the aromatic compounds, such as m-phenylene, p-phenylene, 4,4'-diphenyl, 1,5-naphthalene and 1,4-naphthalene dissocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyl-dimethyl methane-2,2', 5,5'-tetraisocyanate; the polymerized polyisocyanates such as tolylene diisocyanate dimers and trimers, and the like.

Preferably, the polyisocyanate employed should have isocyanate groups with varied reactivity to facilitate the partially-blocking reaction.

In addition, the organic polyisocyanate may be a prepolymer derived from a polyol including polyether polyol or polyester polyol, including polyethers which are reacted with excess polyisocyanates to form isocyanate-terminated prepolymers may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose, and the like, with alkylene oxides such as ethylene oxide, propylene oxide, their mixtures, and the like.

Any suitable aliphatic, cycloaliphatic aromatic alkyl monoalcohol and phenolic compound may be used as a blocking agent in accordance with the present invention, such as, for example, lower aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like; the aromatic alkyl alcohols, such as phenylcarbinol, methylphenylcarbinol, ethylene glycol monoethyl ether, ethylene glycol monobutyl ether, and the like; the phenolic compounds such as phenol itself, substituted phenols in which the substituents do not adversely affect the coating operations. Examples include cresol, xylenol, nitrophenol, chlorophenol, ethylphenol, t-butyl phenol and 2,5-di-t-butyl-4-hydroxy toluene. Minor amounts of higher molecular weight, relatively non-volatile monoalcohols may be used, if desired, to serve as plasticizers in the coatings provided by this invention.

Additional blocking agents include tertiary hydroxylamines such as diethylethanolamine and oximes such as methyl ethyl ketone oxime, acetone oxime and cyclohexanone oxime. Use of oximes and phenols is particularly desirable because polyisocyanates blocked with these agents unblock at relatively low temperatures without the need for externally added urethane forming catalyst such as tin catalyst.

The semi-capped organic polyisocyanate is formed by reacting a sufficient quantity of blocking agent with the organic polyisocyanate to provide a product having one free isocyanate group remaining.

As previously set forth, the epoxy-containing materials are reacted with an amine to form an adduct. The amine employed may be any primary or secondary amine, preferably a secondary amine. Preferably the amine is a water-soluble amino compound. Exmples of such amines include mono- and dialkylamines such as methylamine, ethylamine, propylamine, butylamine, dimethylamine, diethylamine, dipropylamine, dibutylamine, methylbutylamine, and the like.

While in most instances reasonably low molecular weight amines may be employed, it is possible to employ higher molecular weight monoamines, especially where it is preferred that the molecule be flexibilized or further modified by the structure contributed by the amines. Likewise, a mixture of low molecular weight and high molecular weight amines may be employed to modify the resin properties.

Further, it is possible for the amines to contain other constituents so long as they do not interfere with the reaction of the amine and the epoxy group and are of the nature or employed under the conditions so that they do not gel the reaction mixture.

The epoxy containing material, the semi-capped isocyanate and the amine may be reacted in alternative order.

Where the epoxy group-containing material also contains hydroxyl groups, for example, the higher polyglycidyl ethers of polyphenols, the epoxy may be first reacted with the semi-capped polyisocyanate. The portion reacted is not unduly critical. Preferably sufficient semi-capped isocyanate is employed to provide an adequate number of crosslinking sites to provide a cured film. Usually about one-half of the available hydroxyl groups are reacted. The maximum amount reacted can be the equivalence of the total hydroxyl functionality together with half the epoxy functionality.

Preferably this reaction is conducted at low or moderate temperatures, generally less than about 120° C. to preserve the capped isocyanate groups in order to avoid gelation and to retain latent crosslinking sites. Usually the reaction is conducted in the presence of a catalyst for urethane formation at a temperature between about 60° C. and about 120° C. Temperatures of about 100° C. are commonly employed.

After the completion of the above reaction, the resulting product is then reacted with the amine. The reaction of the amine with the epoxy group-containing material takes place upon admixing the amine and the epoxy group-containing material. In fact, the reaction is frequently exothermic. If desired, the reaction mixture, if necessary, may be heated to moderate temperature, that is, 50° C. to about 130° C., care being taken to preserve the capped isocyanate groups previously added. It is frequently desirable in any event to elevate the temperature at least slightly for a sufficient time to insure complete reaction.

The amount of amine reacted with the epoxy group-containing material is at least that amount sufficient to render the resin cationic in character, that is, transportable to the cathode when acid solubilized. In some instances substantially all of the epoxy groups in the resin are reacted with an amine. However, excess epoxy groups may remain which hydrolyze upon contact with water to form hydroxyl groups.

Alternatively, the epoxy group-containing material may first be reacted with the amine to form an amine-epoxy adduct.

In either case, the ratio of capped isocyanate groups to hydroxyl groups in the final aqueous dispersion is from about 0.5 to 2.0 isocyanate groups for each hydroxyl group.

It is usually necessary, in order to insure rapid and complete curing of the polymers of the invention, to have present in the coating mixture a catalyst for urethane formation. However, if curing temperatures after deposition are high enough catalyst may not be needed. Also if proper blocking agent for the isocyanate is employed, e.g., oximes catalyst may not be needed. Examples of externally added catalyst are the tin compounds such as dibutyl tin dilaurate and tin acetate are preferred but other catalysts for urethane formation known in the art may be employed. The amount of catalyst employed is that amount which effectively promotes reaction of the deposited film, for example, amounts varying from about 0.5 percent to about 4 percent by weight of the polymer may be employed. Typically about 2 percent by weight is employed.

The polymer of the invention and catalyst mixture is electrodeposited on a suitable substrate and cured at elevated temperatures, such as from about 250° F. to about 600° F., the film curing at least in part through urethane crosslinks. The alcohol released may either volatilize or remain in the mixture as a plasticizer, depending essentially on its boiling point.

Aqueous components containing the above components are highly useful as coating compositions, particularly suited to application by electrodeposition, although they may also be applied by conventional coating techniques. It is necessary to add a neutralizing agent to obtain a suitable aqueous composition. It is desirable to electrodeposit these coatings from a solution having a pH between about 3 and about 9.

Neutralization of these products is accomplished by the reaction of all or part of the amino groups by water-soluble acid, for example, formic acid, acetic acid, or phosphoric acid, or the like. The extent of neutralization depends upon the particular resin and it is only necessary that sufficient acid be added to solubilize or disperse the resin.

Electrodepositable compositions, while referred to as "solubilized", in fact, are considered a complex solution, dispersion or suspension or combination of one or more of these classes in water, which acts as an electrolyte under the influence of an electric current. While, no doubt, in some instances the resin is in solution, it is clear that in some instances, and perhaps in most, the resin is a dispersion which may be called a molecular dispersion of molecular size between a colloidal suspension and a true solution.

The concentration of the product in water depends upon the process parameters to be used and is in general not critical, but ordinarily the major proportion of the aqueous composition is water, e.g., the composition may contain one to 25 percent by weight of resin. In most instances, a pigment composition and, if desired, various additives such as anti-oxidants, surface-active agents, coupling solvents, and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, and the like.

In electrodeposition processes employing the aqueous coating compositions described above, the aqueous composition is placed in contact with an electrically-conductive anode and an electrically-conductive cathode, with the surface to be coated being the cathode. Upon passage of electric current between the anode and the cathode, while in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are in general similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically-conductive substrate, and especially metals such as steel, aluminum, copper, and the like.

After deposition, the coating is cured at elevated temperatures by any convenient method, such as in baking ovens or with banks of infrared heat lamps. Curing temperatures are preferably from about 350° F. to about 425° F., although curing temperatures from about 250° F. to about 500° F., or even 600° F. may be employed, if desired.

Illustrating the invention are the following examples, which, however, are not to be construed as limiting the invention to their details. All parts and percentages in the examples, as well as throughout this specification, are by weight unless otherwise specified.

EXAMPLE A

A cationic pigment dispersant was prepared by heating 746.2 parts of stearyl glycidyl ether (Proctor and Gamble's Epoxide 45) and 224 parts of ethylene glycol monobutyl ether to about 50° C. and adding 150.2 parts of n-methyl ethanolamine over a 30-minute period with external cooling to keep the bath temperature below 100° C. When all the amine was added, the batch was held an additional hour at 100° C. before cooling and storage.

To prepare a grinding vehicle from this cationic pigment dispersant, 200 parts were blended with 38.5 parts of 88 percent lactic acid and 515 parts of deionized water.

To prepare a pigment paste, 90 parts of this grinding vehicle were blended with 4 parts of acetylenic alcohol defoamer (Surfynol 104-A), 60 parts of phthalocyanine blue, 140 parts of iron oxide brown and 306 parts of deionized water, and the resultant slurry ground in a suitable mill to a Hegman No. 7.

EXAMPLE I

A partially-blocked 2,4-toluene diisocyanate was prepared by adding 260.5 parts by weight of 2-ethylhexanol slowly to 348.0 parts of 2,4-toluene diisocyanate over a period of approximately 1¾ hours, while mixing under a blanket of dry nitrogen gas and externally cooling the batch to maintain the reaction temperature below 18° C. The batch was then mixed an additional 4 hours.

A self-crosslinking, cationic polyurethane resin was prepared by first dissolving 100 parts of polyglycidyl ether of bisphenol A (Epon 1004) possessing an equivalent weight per epoxide group of 910, in 367.2 parts of N-methyl pyrrolidone and 244.8 parts of 4-methoxy-4-methyl pentanone-2 (Pent-Oxone) with agitation and hetaing. When in solution and cooled to approximately 60° C. under a dry nitrogen blanket, 517 parts of the above partially-blocked diisocyanate were introduced and 5 drops of dibutyl tin dilaurate catalyst added. The batch was then heated to approximately 100° C. and held until no free isocyanate groups were evident, as determined by infrared scanning. This required about 30 minutes heating at 100° C. The batch was then cooled to 60° C. and 79.2 parts of diethylamine were added slowly. After reheating to 100° C. and holding for an additional 2 hours, the resultant self-crosslinking cationic urethane resin was cooled.

Twenty-eight (28) parts of the above resin at 73.5 percent content was blended with 0.4 part of dibutyl tin dilaurate, followed by 1.5 parts of glacial acetic acid, and then finally by approximately 370 parts of deionized water. The resultant resin dispersion of approximately 5 percent nonvolatile content and a pH of 4.5 was electrodeposited on a zinc-phosphate steel cathode for 90 seconds at 300 volts, yielding an acetone-resistant film of 0.5 mil film thickness and a 4H pencil hardness after curing 10 minutes at 350° F.

EXAMPLE II

A partially-blocked 2,4-toluene diisocyanate sample was prepared by adding 180.2 parts of ethylene glycol monoethyl ether to 348 parts of 2,4-toluene diisocyanate over about a 90-minute period while mixing under a blanket of dry nitrogen gas and externally cooling the batch to maintain the reaction temperature below 20° C.

A self-crosslinking cationic polyurethane resin was prepared by dissolving 100 parts of polyglycidyl ether of bisphenol A (Epon 1001) possessing an epoxide equivalent weight of 500, in 400 parts of methyl isobutyl ketone with agitation and heat. The batch was cooled to 75° C. and 411.3 parts of the above ethylene glycol monoethyl ether monourethane of 2,4 TDI added slowly over an hour while slowly heating the batch to 95°–100° C. The batch was then held for about one hour at this temperature until all isocyanate groups were reacted as indicated by an infrared scan. After cooling to 80° C., 146.2 parts of diethylamine (essentially stoichiometrically equivalent to the epoxide groups present) were added and the batch reheated to 100° C. and held for one hour before cooling.

292 parts of the above resin were blended with 23.6 parts of 88 percent lactic acid followed by 4.4 parts of dibutyl tin dilaurate, and then thinned slowly with 3043 parts of deionized water. The resultant electrodeposition bath showed a pH of 5.9 and conductivity of 1300 mmhos./cm. A cold rolled steel panel was cathodically coated at 150 volts for 2 minutes and cured 45 minutes at 350° F. to yield a smooth, hard film of 0.5 mil film thickness.

EXAMPLE III

A partially-blocked 2,4-toluene diisocyanate sample was prepared by adding 696 parts of 2,4-toluene diisocyanate slowly to 296.5 parts of butanol over a period of approximately one hour while mixing under a blanket of dry nitrogen gas and externally cooling to maintain the reaction temperature below 16° C. The batch was then mixed an additional hour.

A self-crosslinking cationic polyurethane resin was prepared by first dissolving 100 parts of polyglycidyl ether of bisphenol A (Epon 1001) possessing an equivalent weight of 500 grams per epoxide group in 424 parts of cyclohexanone with agitation and heating. When in solution and cooled to 55° C., 146.2 parts of diethylamine (essentially stoichiometrically equivalent to the epoxide groups present) were added and the batch heated to 100° C. and held approximately 1½ hours. At this point 645.1 parts of the above partially-blocked diisocyanate was introduced and the batch heated to 125° C. and held 2½ hours until no free isocyanate groups were evident as determined by infrared scanning. The batch was cooled to 100° C., neutralized with 270.4 grams of 88 percent aqueous lactic acid, and reduced to 76 percent nonvolatiles with about 500 parts of water.

A black, self-crosslinking cationic polyurethane finish was then prepared by grinding 40.5 parts of phthalocyanine blue and 94.5 parts of iron oxide brown in 9.63 parts of cationic surfactant (American Cyanamid Aerosol C-61) and 395.37 parts of deionized water and then blending this paste (540 parts) with 711 parts of the above-neutralized resin, 67.5 parts of polycaprolactone diol plasticizer (average molecular weight 1250- Union Carbide's PCP-2030), 9 parts of dibutyl tin dilaurate and 3547.5 parts of deionized water.

The resultant electrodeposition bath of approximately 12 percent nonvolatile content displayed a pH of 4.6, a rupture voltage of 240 volts and throw power of 5¾ inches at 200 volts.

A zinc phosphated steel cathode was coated in the bath for 2 minutes at 200 volts and then baked 45 minutes at 350 volts to yield a smooth black film of 7H pencil hardness and 0.3 mil film thickness.

EXAMPLE IV

A 2-ethylhexanol monourethane of 2,4-toluene diisocyanate was prepared by adding 585.9 parts of 2-ethylhexanol to an agitated mixture of 783 parts of 2,4-toluene diisocyanate and 60 parts of methyl butyl ketone over approximately a 5-hour period with external cooling to maintain the reaction temperature below 30° C. After the addition was complete, an additional 30 parts of methylbutyl ketone was added; and the batch stored under dry nitrogen for subsequent use.

A self-crosslinking cationic polyurethane resin was then prepared by first dissolving 632.4 parts of polyglycidyl ether of bisphenol A (Epon 1001) possessing an equivalent weight of 526 per epoxide group, in 177.4 parts of methylbutyl ketone, and refluxing for about 15 minutes to remove any water present by use of a decanting trap in the distillate return line. After cooling to 70° C, 87.7 parts of diethylamine were introduced and the batch heated to about 140° C. with removal of about 100 parts of solvent. The batch was then cooled to 100° C, the solvent replaced, and 522.4 parts of the above 2-ethylhexanenol monourethane of 2,4-toluene diisocyanate added. Upon heating the batch to 120° C. over a one-hour period, all NCO was found to have reacted, as indicated by an infrared scan. The batch was then thinned to 78 percent solids with 196 parts of propylene glycol monomethyl ether.

A reactive plasticizer for use with this self-crosslinking cationic urethane resin was then prepared by adding 248 parts of the 2-ethylhexanol monourethane of 2,4-toluene diisocyanate to 1250 parts of polytetramethylene glycol (Quaker Oats POLYMEG 3000) possessing an average molecular weight of 2940 and heating the mixture to 100°–110° C. and holding for about 5 hours until all NCO groups were reacted, as determined by infrared scanning.

To 487 parts of the above cationic urethane was blended 43 parts of the above reactive plasticizer, and 38 parts ethylene glycol monohexyl ether. This mixture was neutralized with 39 parts 88 percent lactic acid, then blended with 8 parts dibutyl tin dilaurate, 215 parts of the pigment paste of Example A and, finally, thinned with 3465 parts of deionized water. This pigmented self-crosslinking polyurethane cationic electrodepositable composition of approximately 12 percent solids showed a pH of 4.5, conductivity of 875 mmhos./cm. and 2-minute Ford throw power of 7⅜ inches at 350 volts.

When cathodically deposited upon an untreated cold-rolled steel panel for two minutes at 350 volts, and cured 45 minutes at 350° F. this composition yielded a smooth film of 0.3 mil thickness and 3H pencil hardness, which when scribed and placed in a salt fog cabinet at 100° F. for 14 days displayed little or no rust creepage at the scribe.

EXAMPLE V

Into a suitable reactor were charged 314 parts by weight of methyl isobutyl ketone and 1030 parts by weight of a polyglycidyl ether derived from the condensation of Bisphenol A and epichlorohydrin, possessing an epoxy equivalent of 485 (EPON 1001). The mixture was dissolved with agitation and heated to reflux at approximately 128° C. and held for 30 minutes when any water present was azeotroped off and separated in a trap.

The mixture was cooled to 100° C. and 575 parts by weight of the methylethyl ketoxime capped monourethane of isophorone diisocyanate at 90 percent solids in methyl-isobutyl ketone was added to the raction mixture.

The procedure for making this monourethane is to charge isophorone diisocyanate to a reaction vessel and slowly add the methylethyl ketoxime dropwise keeping the temperature below 30° C. After all the methylethyl ketoxime has been added, the cooling is removed and the reaction mixture held for 1 hour without cooling.

After the monourethane was added to the reaction mixture, the mixture was held at 115° C. for 1½ hours. The reaction mixture was then cooled to 80° C., after which time 34.2 parts by weight of a diketimine derived from one mole of diethylene triamine and two moles of methyl isobutyl ketone (as described in U.S. Pat. No. 3,523,925) and 141.15 parts by weight of methyl ethanolamine were added to the reaction mixture. The mixture was then permitted to exotherm with partial cooling, top temperature reaching 97° C. in about 15 minutes. After exotherming, the batch was thinned with 143 parts of ethylene glycol monobutyl ether (CELLOSOLVE).

To prepare an electrodeposition bath, 41.8 parts by weight of the above-described resin was blended with 6 parts by weight of butyl benzyl phthalate and acidified with 1.2 parts by weight of glacial acetic acid. The mixture was then thinned with 351 parts by weight of water to form an electrodeposition bath of approximately 9.25 percent solids solution having a pH of 6.0.

Using conventional electrodeposition procedures, a zinc phosphate pretreated steel panel was electrocoated as a cathode at 50 volts for two minutes, the bath being at room temperature. The panel, after rinsing, was cured in an oven for 10 minutes at 325° F. The baked film was a glossy, acetone-resistant coating of 0.7 mil film thickness and 5H pencil hardness.

In the manner of the above examples, various other epoxy-containing materials, semi-capped polyisocyanates, catalysts, adjuvants and conditions within the scope of the above descriptions may be substituted to achieve similar results.

According to the provisions of the Patent Statutes, there are described above the invention and what are now considered its best embodiments; however, within the scope of the appended claims, it is to be understood that the invention can be practiced otherwise than as specifically described.

We claim:

1. In a method of electrocoating an electrically-conductive surface serving as a cathode which comprises passing electric current between said cathode and an anode in contact with an aqueous electrodepositable composition, the improvement wherein said electrodepositable composition comprises:

A. an acid-solubilized, self-curing synthetic organic resin containing amino groups, hydroxyl groups, and blocked isocyanate groups, wherein said blocked isocyanate groups are stable at room temperature in the presence of hydroxyl or amino groups and are reactive with hydroxyl groups or amino groups at elevated temperatures, and wherein said organic resin is derived from the reaction product of, 1. an epoxy group-containing organic compound,
2. a primary or secondary amine, and 3. a partially-blocked organic polyisocyanate.

2. A method according to claim 1, wherein said blocked isocyanate groups are blocked with a member selected from the group consisting of an aliphatic alkyl monoalcohol, an alkoxyalkyl monoalcohol, a cycloaliphatic alkyl monoalcohol, a tertiary hydroxyl amine, a phenol, and an oxime.

3. A method according to claim 1, wherein the isocyanate groups and the hydroxyl groups are present in a ratio of about 0.5 to about 2.0 blocked isocyanate groups per hydroxyl group.

4. A method according to claim 1, wherein said epoxy group-containing organic compound is a polyglycidyl ether of a polyphenol, and wherein said partially blocked organic polyisocyanate has an average of about one free isocyanate group.

5. A method according to claim 4, wherein said blocked isocyanate groups are blocked with a member selected from the group consisting of an aliphatic alkyl monoalcohol, an alkoxyalkyl monoalcohol, a cycloaliphatic alkyl monoalcohol, a tertiary hydroxylamine, a phenol, and an oxime.

6. A method according to claim 1, in which the electrodepositable composition additionally comprises a catalyst for urethane formation.

\* \* \* \* \*